United States Patent [19]

Becker, III

[11] 4,099,735

[45] Jul. 11, 1978

[54] CONVERTIBLE CART

[75] Inventor: Frederick R. Becker, III, Dallas, Pa.

[73] Assignee: Metropolitan Wire Corporation, Wilkes-Barre, Pa.

[21] Appl. No.: 722,550

[22] Filed: Sep. 13, 1976

[51] Int. Cl.² ............................................. B62B 3/02
[52] U.S. Cl. .................................. 280/79.3; 211/133; D12/29
[58] Field of Search ................. 280/79.3; D12/22, 29, D12/30; 211/133, 134, 189

[56] References Cited

U.S. PATENT DOCUMENTS

| | | | |
|---|---|---|---|
| D. 181,282 | 10/1957 | Frick | D12/28 |
| D. 242,536 | 11/1976 | Becker et al. | D12/22 |
| 2,802,576 | 8/1957 | Kelling | 211/134 X |

OTHER PUBLICATIONS

Food Service Equipment Dealer, 2/1973, back cover, Dishcart, lower left side of page.

*Primary Examiner*—Bruce H. Stoner, Jr.
*Assistant Examiner*—Michael J. Forman
*Attorney, Agent, or Firm*—Friedman, Goodman & Teitelbaum

[57] ABSTRACT

A convertible cart having a shelf and readily assemblable and disassemblable partition members. The cart includes a frame on which the shelf is mounted and casters are included for providing mobility to the cart. The partition which may be in the form of a bottom mat, a back mat, side panels and intermediate panels, are made of rod-like members formed in a grid pattern and which include couplings that permit their interconnection and their convenient assembly and disassembly to and from the frame. The use of conventional fasteners for assembling and disassembling the panels with respect to each other and with respect to the frame is avoided.

25 Claims, 5 Drawing Figures

CONVERTIBLE CART

BACKGROUND OF THE INVENTION

This invention relates generally to carts or the like and more particularly to an improved mobile or rollable cart that is readily convertible for carrying different types of material.

There is a long felt need for a readily convertible mobile cart that may be used for transporting different types types of material having a wide range of sizes. In some instances, the cart may be used for transporting relatively bulky objects, while in other applications the cart may be used for transporting articles that must be maintained separate from one another. A cart, such as disclosed by the present invention, may find utility in a hospital or the like wherein medications and/or hospital supplies must be transported rapidly and efficiently from one area to another with care being taken to assure the separation of the articles during their transport. Another application of the present invention would be to transport relatively bulky items that do not necessarily need isolation from each other during transport from one storage area to another, such as in an industrial plant.

In order to achieve maximum efficiency and utility at a minimum cost, it is desirable that a mobile cart such as used and described hereinabove, be readily convertible with a minimum of skill and without the need for using special tools or hardware. It is also desirable that the means used for separating the articles on the cart all capable of being stored in a condition of minimum volume when not being used and yet are capable of quick assembly and disassembly. In many instances it is desirable and in fact necessary that the means providing for separation of the articles to be transported are easily maintained in a relatively clean condition.

SUMMARY OF THE INVENTION

The present invention meets the needs described hereinabove by providing a cart that includes a frame on which a plurality of mats and panels are removably mounted without the need for extraneous fasteners and without the need for special tools and/or skills. In one aspect of the present invention, a shelf is mounted integrally on a frame that includes a pair of laterally spaced apart, inverted U-shaped members. Support means extend between the frame members and are utilized for mounting a plurality of mats and panels. A first mat is loosely mounted on the support means near the bottom thereof in spaced relationship above the shelf. A back mat is also mounted on the frame and a plurality of panels at the sides of the bottom and back mats are also provided. If desired, one or more intermediate panels may be positioned between the side panels. In an alternative embodiment of the present invention back-to-back assemblies of the panels and mats may also be provided.

Accordingly, it is an object of the present invention to provide an improved, convertible cart, as described above.

It is another object of the present invention to provide an improved, convertible cart, as described above, wherein a plurality of mats and a plurality of panels are loosely mounted on the frame of the cart.

It is still another object of the present invention to provide an improved rollable cart, as described above, that may be readily assembled and disassembled without the need for special tool and/or skills.

Yet another object of the present invention is to provide an improved rollable cart, as described above, wherein the mats and panels are capable of being stored in a flat condition when not in use.

Yet another object of the present invention is to provide an improved convertible cart, as described above, wherein the need for maintenance is minimized.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DESCRIPTION OF THE PREFERRED EMBODIMENT

Figure 1:
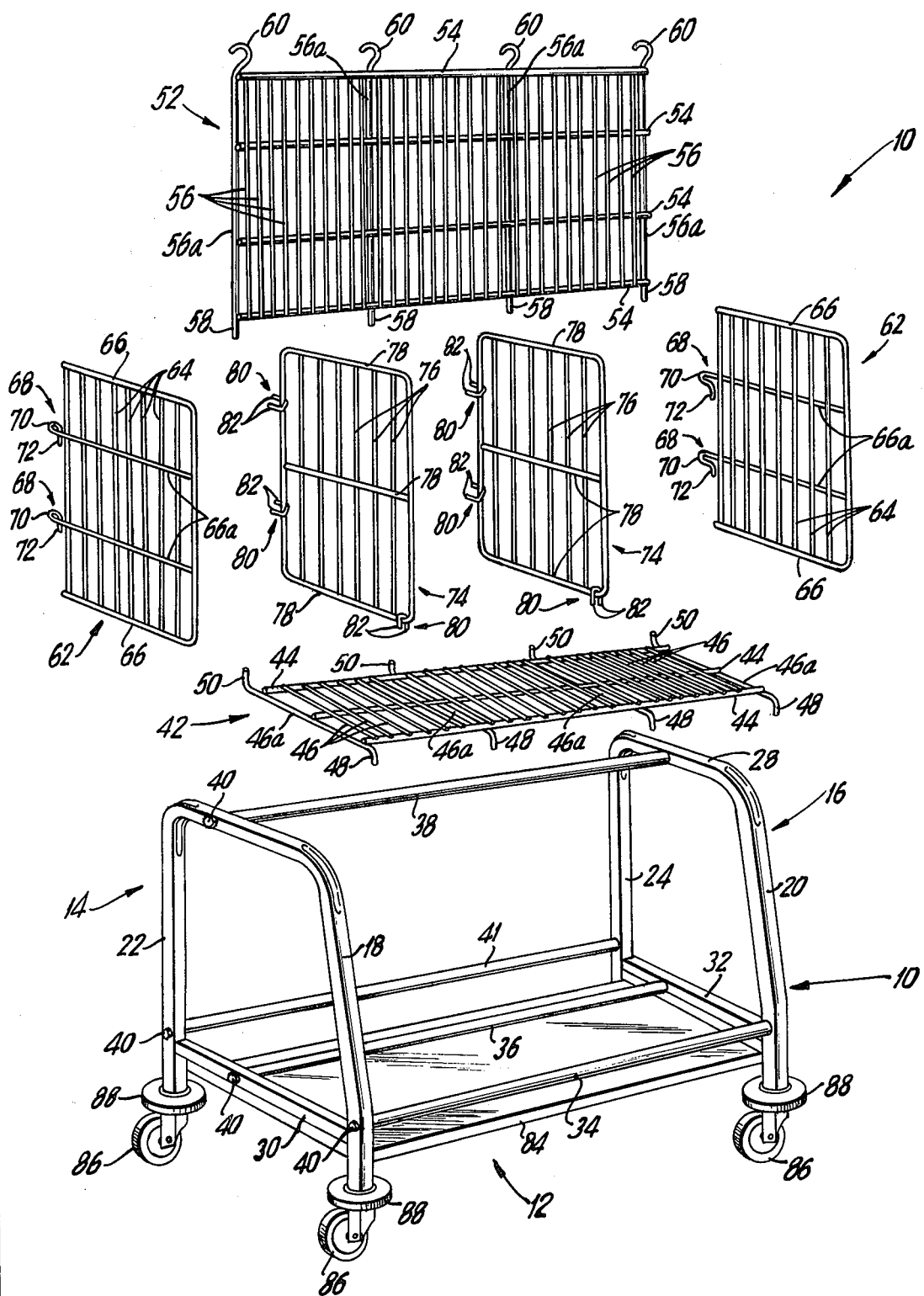
FIG. 1 is an exploded, perspective view illustrating one embodiment of the present invention.

Referring first to FIG. 1, there is shown a convertible rollable cart 10 comprising the present invention. The rollable cart 10 is provided with a frame assembly which is generally designated by the reference character 12 and which includes a pair of inverted and laterally spaced apart, generally U-shaped frame members 14 and 16. The frame members 14 and 16 each include front legs 18 and 20, respectively, rear legs 22 and 24, respectively, and upper transverse connecting members 26 and 28, respectively. Lower transverse connecting members 30 and 32 join the front and rear legs of each U-shaped frame member 14 and 16 proximate the bottom ends thereof.

In the first embodiment of the present invention, first and second lower lateral support means 34 and 36 extend between and are coupled to the lower end of the front legs 18 and 20 and the lower transverse connecting members 30 and 32, respectively. A third, lateral upper support member 38 extends between and is coupled to the upper transverse connecting members 26 and 28. The lateral support means 34, 36 and 38 may be in the form of solid or tubular rods that are secured to their respective frame members by means of hardware such as screws or bolts 40. For purposes of providing sufficient rigidity, still another lateral rod 41 is positioned between and coupled to the rear legs 22 and 24, proximate the lower ends thereof, also utilizing hardware such as screws or bolts 40.

In order to provide one functional aspect of the present invention a plurality of mats and panels are included with the mats and panels being readily assemblable and disassemble to the frame assembly 12 without the use of special tools and/or skills and hardware. As shown for example in FIG. 1, a first bottom mat 42 is provided, said mat 42 including a plurality of rod-like members arranged in a grid-like pattern. There are provided a first plurality of laterally extending rods 44 at the front, the back and the middle portion of the bottom mat 42. In addition, there is provided a plurality of transverse rods 46 secured to the rods 44 in any convenient manner such as by welding, brazing or the like. The axes of the rods 46 are perpendicular to the axes of the rods 44. The forward end 48 of selected ones of the transverse rods 46a are bent downwardly so that they fit over and loosely rest upon and engage the first lower lateral support member 34 as shown for example in FIG. 3. The rearward end 50 of said selected rods 46a are bent upwardly as shown in FIG. 1 for a purpose to be described hereinafter.

Figure 3:
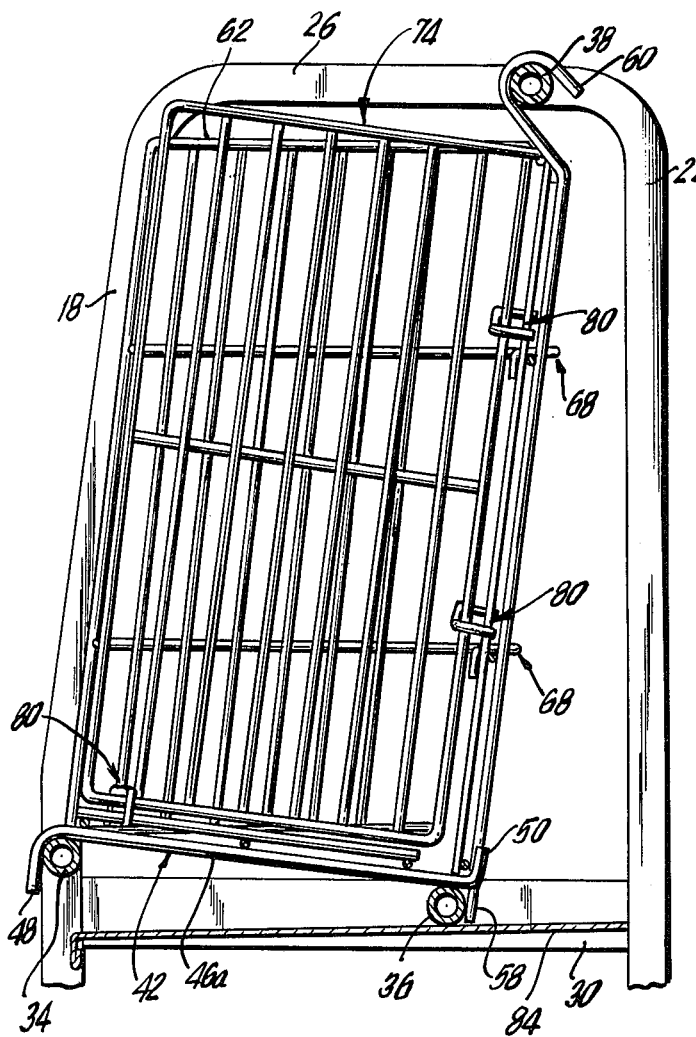
FIG. 3 is a transverse sectional elevational view taken along line 3—3 of FIG. 2.

Still referring to FIG. 1 there is shown a back mat generally designated by the reference character 52 which includes a plurality of laterally extending, rod-like members 54 and a plurality of transverse rod-like members 56 that are secured to the rods 54, such as by welding, brazing or the like. The axes of the rods 54 and 56 are perpendicular to each other in order to define a grid pattern. The lower end 58 of selected ones of the rods 56a are elongated and extend beyond the lowermost laterally extending rod 54. In the assembled condition such as shown in FIG. 3, the extended rod ends 58 are positioned behind the second lower lateral support member 36. The upper end 60 of the selected rods 56a are hook-shaped so that they may be loosely coupled to and rest upon the third, upper lateral support member 38 such as shown in FIG. 3.

Figure 2:
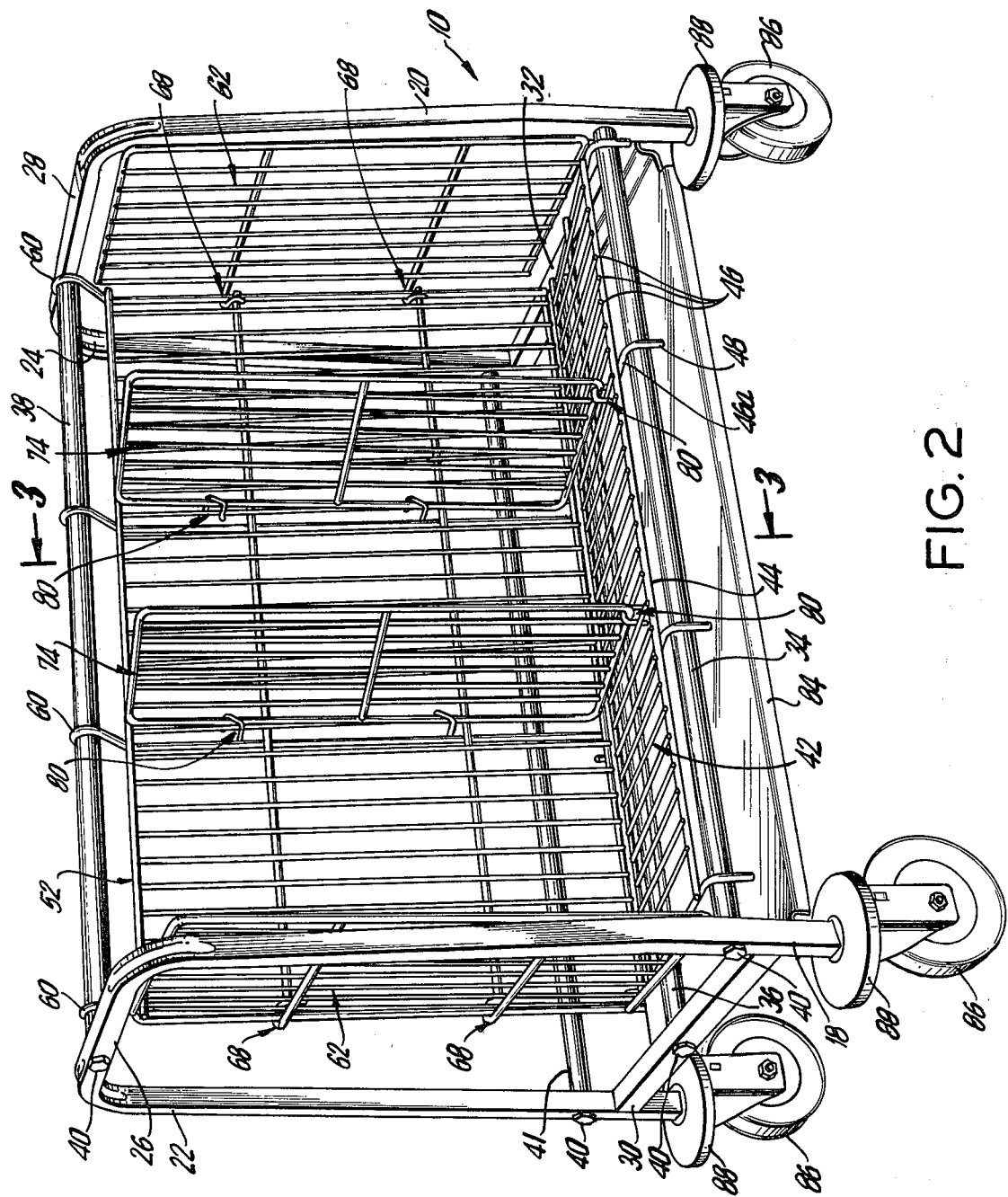
FIG. 2 is a perspective view illustrating the first embodiment of the present invention in the assembled condition.
Figure 4:
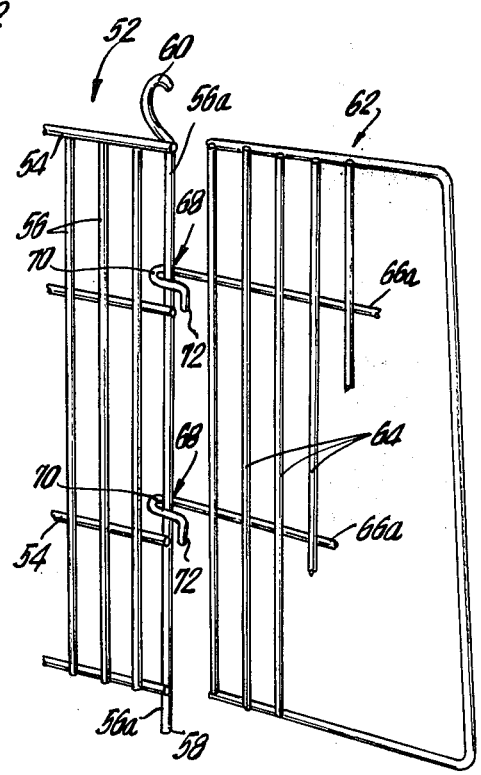
FIG. 4 is a fragmentary perspective view illustrating a novel hinge feature of the present invention.

A pair of side panels designated by the reference character 62 are also provided such as is shown in FIG. 1. Each of the side panels 62 includes a plurality of vertical, rod-like members 64 and a plurality of horizontal rod-like members 66. The rearward ends of selected ones 66a of the rods 66 are provided with integral hinge means 68. As shown best in FIG. 4, the hinge means 68 comprise a substantially U-shaped loop portion 70 including a curved section the axis of which is generally parallel to the axis of the rods 56 of the back mat 52. There is further provided a depending extension 72 that is integral with and approximately at a right angle with respect to one of the legs of the U-shaped portion 70. To assemble the side panel 62 to the back mat 52, the rods 56a of the back mat 52 are positioned between the spaced apart legs of the U-shaped portion 70 as the side panel 62 and the back mat 52 are initially in approximately the same plane. Initially, the extensions 72 are positioned above the rods 54 of the back mat 52. The side panels 72 may then be rotated so that one of the legs of the U-shaped portion 70 rests on one of the rods 54 of the back mat 52. In the assembled condition, such as shown in FIG. 2, the extension 72 will be in front of and will abut the rods 54 to thereby prevent further inward rotation of the side panel 62 with respect to the back mat 52. The front legs 18 and 20 will prevent pivotal movement of the side panel 62 in the opposite angular direction in the assembled condition. Thus, no tools or hardware are required to assemble the side panels 62 to the back mat 52. The combination of the side panels 62 and the back mat 52 may then be readily mounted on the frame assembly 12 merely by engaging the hooks 60 of the back mat 52 onto the third or upper lateral support member 38 such as shown in FIG. 2. The bottom mat 42 is placed in position merely by disposing the downwardly turned ends 48 thereof upon the first lower support member 34 to prevent rearward movement of the bottom mat 42, and by positioning the rods 46 of the bottom mat 42 on the second lower lateral support member 36 such as shown in FIG. 3.

In addition, one or more intermediate panels generally designated by the reference character 74 may also be provided. Each of the intermediate panels 74 includes a first plurality of rod-like members 76 and a second plurality of rod-like member 78 which are arranged in a grid-like pattern. In order to loosely couple the intermediate panels 74 to the bottom mat 42 and the back mat 52 without the use of either special tools, hardware or skills, a plurality of clip means generally designated by the reference character 80 are provided. Each clip means 80 is U-shaped and is arranged so that the spaced apart legs 82 thereof straddle the rearwardmost rod 76 of the intermediate panels 74. At least one clip 80 is also secured to the lower most rod 78 of each intermediate panel 74 with the clip means 80 being rigidly positioned in any convenient manner, such as by welding, brazing or the like. Advantageously, the plane defined by the legs 82 of each clip means 80 is at an angle with respect to the axis of the rods 76 or 78 to which it is secured in order to minimize play between the clip means 80 and the rod that is engaged thereby on either the bottom mat 42 or the back mat 52. That is, the clip means is positioned such that the dimension between the legs 82 thereof in a plane perpendicular to the axis of the rod engaged thereby is the same or is only slightly greater than the diameter of the rod engaged thereby.

A shelf 84 is secured to the legs 18, 20, 22 and 24 in any convenient manner such as by welding, brazing or the like. In the assembled condition, the shelf 84 is directly below the removable bottom mat 42. The ends 58 of selected ones of the rods 56 of the back mat 52 are positioned rearwardly of the second, lower support member 36 to prevent forward movement of the engaged back and bottom mats 52, 42, as indicated in FIG. 3, the ends 58 being in closely spaced relationship to the top surface of the shelf 84, where the upwardly bent ends 50 of the bottom mat 42 prevent rearward movement of the back mat 52. Thus, in the absence of the bottom mat 42, the back mat 52, the side panels 62 and the intermediate panels 74, the cart 10 may be used for transporting relatively bulky material. The cart 10 may be readily converted for the transport of smaller items merely by adding the bottom mat 42, the back mat 52, the side panels 62 and one or more of the intermediate panels 74 as required. In this connection, it should be noted that the second, lower support member 36 is positioned lower than the first, lower support member 34 such as shown in FIG. 3 so that the assembly of the bottom mat 42, the back mat 52, the side panels 62 and the intermediate panels 74 slopes rearwardly from front to back in order to minimize the likelihood of any of the articles being carried thereon from falling off.

In the first embodiment of the present invention, as exemplified by FIGS. 1-4, a plurality of caster means 86 are secured, in any suitable manner, to the lower ends of the legs 18, 20, 22 and 24. Where four casters means 86 are provided, it is preferrable that two of them, for example the two caster means 86 secured to the legs 18 and 22 be swivelable. In addition, each of the legs 18, 20, 22 and 24 are provided with bumper means 88 which may be made of any suitable, resilient material such as rubber, a composition thereof or the like.

Figure 5:
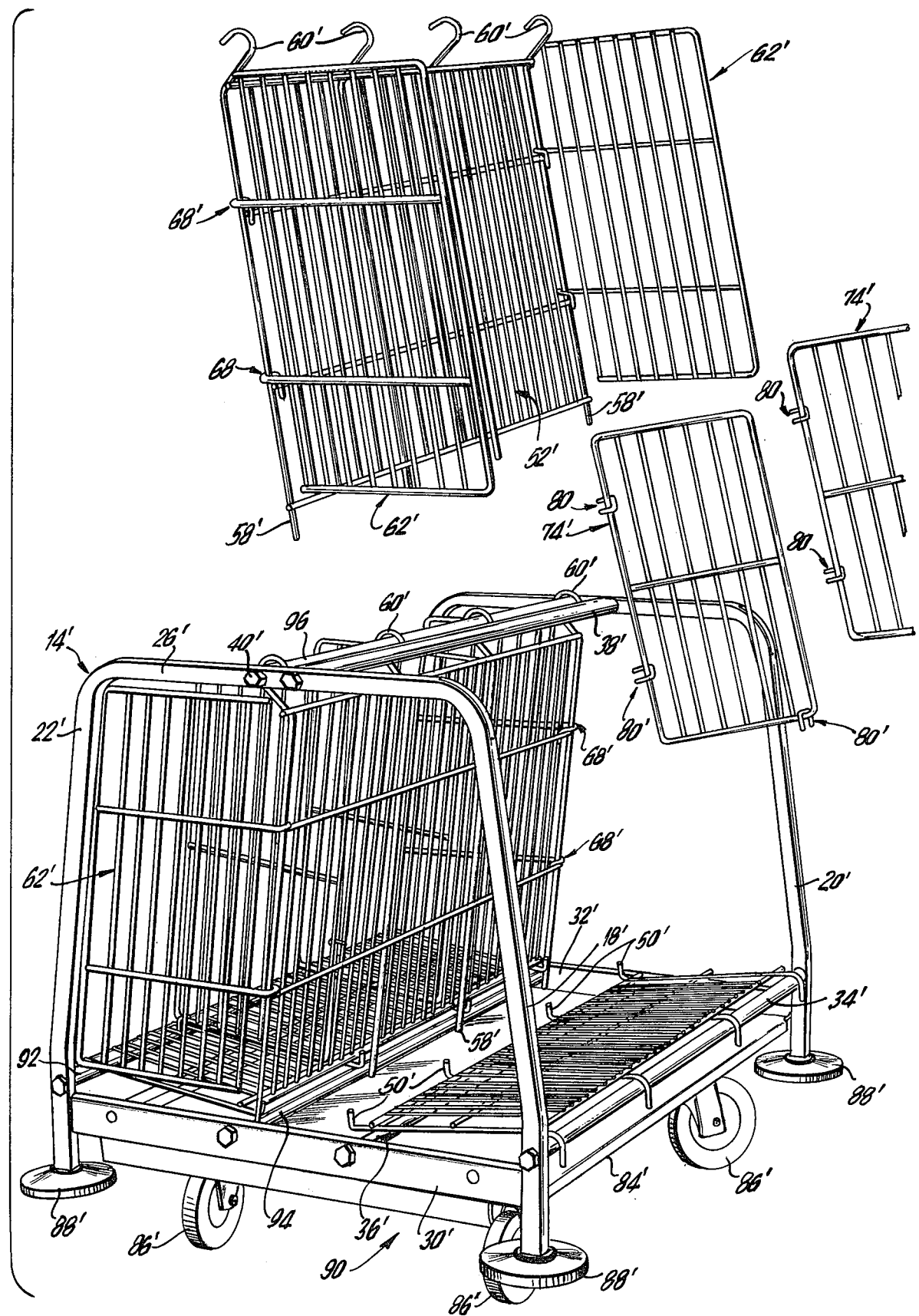
FIG. 5 is a fragmentary, exploded view illustrating an alternative embodiment of the present invention.

An alternative embodiment of the present invention is shown in FIG. 5. The cart 90 comprising the alternative embodiment of the present invention is functionally and structurally the same as that described in connection with the first embodiment but with a few exceptions. Where the structure of the second embodiment is the same as that of the first embodiment, primed reference characters will be employed and the description thereof will not be repeated.

In the second embodiment of the present invention back-to-back assemblies of the mats and panels are utilized. In order to facilitate assembly of the two sets of mats and panels there is provided fourth and fifth lower lateral support members 92 and 94, respectively. In addition, a sixth upper lateral support member 96 is also provided. It will be noted that the axis of the fourth lower support member 92 is slightly higher than the axis of the fifth lower support member 94 so that the rearward assembly of mats and panels slopes towards the center of the cart 90. In addition, the caster means 86' in the second embodiment of the present invention may be secured to the underside of the shelf 84'. The mats and panels in the second embodiment of the present invention are assembled and disassembled in the same manner as described in connection with the first embodiment of the invention shown in FIGS. 1-4.

It will be apparent from the foregoing that a relatively low cost, simple structure has been provided for fabricating a convertible, rollable cart. Where the cart is used to transport relatively large articles an integral shelf is utilized. Where relatively small articles are to be transported, readily removable mats and panels are utilized with the mats and panels being assemblable and disassemblable without the need for special tools, hardware, and/or skills.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:
1. A convertible cart comprising:
   (a) frame means including a pair of laterally spaced apart end members each having front and rear legs and connecting tranverse members proximate upper and lower ends thereof, respectively;
   (b) first and second lateral support means extending between said end members, said first support means being coupled to lower ends of said front legs, and said second support means being coupled to lower ones of said connecting transverse members;
   (c) third lateral support means extending between and coupled to upper ones of said connecting transverse members;
   (d) a bottom mat loosely mounted on said first and said second lateral support means;
   (e) a back mat having an upper end loosely coupled to said third lateral support means and having a lower end positioned adjacent said bottom mat;
   (f) at least one panel disposed forwardly from said back mat and upwardly from said bottom mat, said one panel including first clip means for releasably engaging a first rod-like member of said bottom mat and second clip means for releasably engaging a second rod-like member of said back mat;
   (g) each said first and second clip means including a pair of legs to provide a U-shaped member, each said U-shaped member straddling and being secured to a selected one of rod-like members of said one panel, said legs of said first clip means extending downwardly and straddling said first rod-like member of said bottom mat for engagement therewith, said legs of said second clip means extending rearwardly and straddling said second rod-like member of said back mat for engagement therewith, a plane of each said pair of legs being disposed at an angle with respect to associated ones of said rod-like members being straddled thereby; and
   (h) shelf means integral with said frame means.

2. A cart according to claim 1, wherein said first support means is disposed higher on said frame means than said second support means so that said bottom mat slopes downwardly from said first support means towards said second support means.

3. A cart according to claim 1, wherein at least another panel is disposed forwardly from said back mat and upwardly from said bottom mat, said another panel being spaced from said one panel.

4. A cart according to claim 3, wherein said another panel includes hinge means for releasably engaging said back mat, said hinge means being arranged for permitting limited pivotal movement of said another panel with respect to said back mat.

5. A cart according to claim 4, wherein said another panel is a side panel of said cart, one said side panel being disposed on one side of said one panel and a second said side panel being disposed on an opposite side of said one panel in a spaced apart arrangement.

6. A cart according to claim 1, wherein caster means are provided at bottom end of each of said front and rear legs of said end members for moving said cart.

7. A cart according to claim 1, wherein said bottom mat, said back mat and said one panel are each comprised of a plurality of rod-like members secured together to provide a grid-like pattern.

8. A cart according to claim 1, wherein there is further included:
   (a) fourth and fifth lateral support means extending between said end members, said fourth support means being coupled to lower ends of said rear legs, said fifth support means being coupled to said lower ones of said connecting transverse members and being closer to said fourth support means than said second support means;
   (b) sixth lateral support means extending between and coupled to said upper ones of said connecting transverse members, said sixth support means being disposed rearwardly of said third support means;
   (c) a second bottom mat loosely mounted on said fourth and fifth support means; and
   (d) a second back mat having an upper end loosely coupled to said sixth support means and having a lower end positioned adjacent said second bottom mat.

9. A cart according to claim 8, wherein at least another panel is disposed rearwardly from said second back mat and upwardly from said second bottom mat.

10. A convertible cart comprising:
   (a) frame means including a pair of laterally spaced apart end members each having front and rear legs and connecting transverse members proximate upper and lower ends thereof, respectively;
   (b) first and second lateral support means extending between said end members, said first support means being coupled to lower ends of said front legs, and said second support means being coupled to lower ones of said connecting transverse members;

(c) third lateral support means extending between and coupled to upper ones of said connecting transverse members;

(d) a bottom mat loosely mounted on said first and said second lateral support means;

(e) a back mat having an upper end loosely coupled to said third lateral support means and having a lower end positioned adjacent said bottom mat;

(f) at least one panel disposed forwardly from said back mat and upwardly from said bottom mat, said one panel including hinge means for releasably engaging a first rod-like member of said back mat, said hinge means including second rod-like members extending rearwardly from and being secured to said one panel, said hinge means being arranged for permitting limited pivotal movement of said one panel with respect to said back mat when said second rod-like members engage said first rod-like member;

(g) shelf means integral with said frame means; and (h) said bottom mat, said back mat, and said at least one panel are each comprised of a plurality of rod-like members secured to each other in a grid-like pattern.

11. A cart according to claim 10, wherein each of said second rod-like members includes a substantially U-shaped portion having a pair of legs connected by a curved section for engaging said first rod-like member of said back mat, an end portion of each said rod-like members being integral with and extending at approximately a right angle with respect to an associated one of said legs of said U-shaped portion, each said end portion being arranged to abut another associated rod-like member of said back mat, each said another rod-like member being perpendicular to said first rod-like member, whereby said end portions engage said another associated rod-like members to limit the pivotal movement of said one panel in one angular direction.

12. A cart according to claim 10, wherein said first support means is disposed higher on said frame means than said second support means so that said bottom mat slopes downwardly from said first support means towards said second support means.

13. A cart according to claim 10, wherein at least another panel is disposed forwardly from said back mat and upwardly from said bottom mat, said another panel being spaced from said one panel.

14. A cart according to claim 13, wherein said another panel includes first clip means for releasably engaging said bottom mat and second clip means for releasably engaging said back mat.

15. A cart according to claim 14, wherein said one panel is a side panel of said cart, one said side panel being disposed on one side of said another panel and a second said side panel being disposed on an opposite side of said another panel in a spaced apart arrangement.

16. A cart according to claim 10, wherein caster means are provided at a bottom end of each of said front and rear legs of said end members for moving said cart.

17. A cart according to claim 10, wherein said bottom mat, said back mat and said one panel are each comprised of a plurality of rod-like members secured together to provide a grid-like pattern.

18. A cart according to claim 10, wherein there is further included:

(a) fourth and fifth lateral support means extending between said end members, said fourth support means being coupled to lower ends of said rear legs, said fifth support means being coupled to said lower ones of said connecting transverse members and being closer to said fourth support means than said second support means;

(b) sixth lateral support means extending between and coupled to said upper ones of said connecting transverse members, said sixth support means being disposed rearwardly of said third support means;

(c) a second bottom mat loosely mounted on said fourth and fifth support means; and (d) a second back mat having an upper end loosely coupled to said sixth support means and having a lower end positioned adjacent said second bottom mat.

19. A cart according to claim 18, wherein at least another panel is disposed rearwardly from said second back mat and upwardly from said second bottom mat.

20. A convertible cart comprising:

(a) frame means including a pair of laterally spaced apart end members each having front and rear legs and connecting transverse members proximate upper and lower ends thereof, respectively;

(b) first and second lateral support means extending between said end members, said first support means being coupled to lower ends of said front legs, and said second support means being coupled to lower ones of said connecting transverse members;

(c) third lateral support means extending between and coupled to upper ones of said connecting transverse members;

(d) a bottom mat loosely mounted on said first and said second lateral support means;

(e) a back mat having an upper end loosely coupled to said third lateral support means and having a lower end positioned adjacent said bottom mat;

(f) said bottom mat including first means for preventing rearward movement of said bottom mat relative to said frame means, said first means including first rod-like members having downwardly turned ends, said first rod-like members being disposed on said first support means with said downwardly turned ends being coupled in front of said first support means;

(g) said bottom mat including second means for preventing rearward movement of said back mat relative to said bottom mat, said second means including second rod-like members having upwardly turned ends, said second rod-like members being disposed on said second support means with said upwardly turned ends being coupled behind a lower end portion of said back mat;

(h) said back mat including third means for engaging said third support means, said third means including third rod-like members having hooked ends for hanging on said third support means; and (i) said back mat including fourth means for preventing forward movement of said back and bottom mats relative to said frame means when said back and bottom mats are coupled by said second means, said fourth means including fourth rod-like members extending dowdwardly from said lower end portion of said back mat, said fourth rod-like members being disposed behind said second support means.

21. A cart according to claim 20, wherein said first support means is disposed higher on said frame means than said second support means so that said bottom mat slopes downwardly from said first support means towards said second support means.

22. A cart according to claim 20, wherein at least one panel is disposed forwardly from said back mat and upwardly from said bottom mat.

23. A cart according to claim 20, wherein caster means are provided at bottom end of each of said front and rear legs of said end members for moving said cart.

24. A cart according to claim 20, wherein said bottom mat and said back mat are each comprised of a plurality of rod-like members secured together to provide a grid-like pattern.

25. A cart according to claim 20, wherein there is further included:
 (a) fourth and fifth lateral support means extending between said end members, said fourth support means being coupled to lower ends of said rear legs, said fifth support means being coupled to said lower ones of said connecting transverse members and being closer to said fourth support means than said second support means;
 (b) sixth lateral support means extending between and coupled to said upper ones of said connecting transverse members, said sixth support means being disposed rearwardly of said third support means;
 (c) a second bottom mat loosely mounted on said fourth and fifth support means; and
 (d) a second back mat having an upper end loosely coupled to said sixth support means and having a lower end positioned adjacent said second bottom mat.

* * * * *